United States Patent [19]

Muth et al.

[11] 4,283,822
[45] Aug. 18, 1981

[54] METHOD OF FABRICATING COMPOSITE NOZZLES FOR WATER COOLED GAS TURBINES

[75] Inventors: Myron C. Muth, Amsterdam; William F. Schilling, Rexford; Edwin L. Teaney, Schenectady; Leo C. Willmott, Ballston Spa, all of N.Y.

[73] Assignee: General Electric Company, Schenectady, N.Y.

[21] Appl. No.: 106,681

[22] Filed: Dec. 26, 1979

[51] Int. Cl.³ .................... B23P 15/04; B23K 20/14
[52] U.S. Cl. .................... 29/156.8 H; 29/156.8 B; 415/115; 228/193
[58] Field of Search ............ 29/156.8 B, 156.8 H; 416/92, 95, 96 R, 97 R; 415/115; 228/193, 183, 263 G

[56] References Cited

U.S. PATENT DOCUMENTS

| 3,446,481 | 5/1969 | Kydd | 416/92 |
|---|---|---|---|
| 3,773,506 | 11/1973 | Larker et al. | 416/97 |
| 3,928,901 | 12/1975 | Schilling et al. | 29/156.8 B |
| 4,137,619 | 2/1979 | Beltran et al. | 29/156.8 H |
| 4,156,582 | 5/1979 | Anderson | 416/92 |
| 4,183,456 | 1/1980 | Schilling et al. | 29/156.8 H |

*Primary Examiner*—Daniel C. Crane
*Attorney, Agent, or Firm*—Jerome C. Squillaro

[57] ABSTRACT

A method of fabricating a composite nozzle for water-cooled, high temperature gas turbines is provided wherein the nozzle comprises a thermally conducting copper core, a top endwall, a bottom endwall, metal tubing through which water may pass embedded in and extending through the core and into the endwalls and a preformed cladding to protect the nozzle against corrosion. The method utilizes hot isostatic pressure to diffusion bond the nozzle components into an assembly and bond the corrosion resistant cladding to the outer surface of the assembly.

5 Claims, 5 Drawing Figures

METHOD OF FABRICATING COMPOSITE NOZZLES FOR WATER COOLED GAS TURBINES

BACKGROUND OF THE INVENTION

The advantages of using liquid cooling of gas turbine buckets and nozzles are well known. Structural arrangements for open-circuit liquid cooling of gas turbine vanes are shown by Kydd U.S. Pat. No. 3,446,481. Further improvements were invented by Anderson, U.S. Pat. No. 4,156,582 which discloses water cooled turbine buckets wherein the water cooling channels are formed using preformed tubes which are located beneath an outer protective layer composed of an inner skin to provide high thermal conductivity and an outer skin to provide protection from hot corrosion.

Schilling et al, in U.S. Pat. application Ser. No. 924,981, filed July 17, 1978, now U.S. Pat. No. 4,183,456, discloses a method of fabricating cooled gas turbine buckets and nozzles which utilizes hot isostatic pressure with molten glass as a pressure transmitting medium. Preformed tubing is brazed into channels in the airfoil or core. Then the tubing and cladding are bonded to a core under conditions such that the ends of the tubing extend above the molten glass to prevent collapsing of the tubing during hot isostatic pressing.

A method of diffusion bonding to a convex-concave substrate is disclosed by Schilling et al, U.S. Pat. No. 3,952,939. According to this process, an oxidation and hot corrosion resistant cladding is metallurgically bonded by hot gas isostatic pressure to a structural alloy having a convex-concave surface, such as an air-foil employed in a nozzle or blade in a gas turbine.

Another method for fabricating complex composite components for water-cooled, high temperature gas turbines is disclosed by Beltran, et al, U.S. Pat. No. 4,137,619. Each component comprises a core, a thermally conducting layer of copper bonded to the core, metal tubing through which water may pass embedded in the layer, and a corrosion resistant cladding. The method utilizes powder metallurgy techniques to form the thermally conducting layer and hot isostatic pressure to bond the corrosion resistant cladding to the outer surface of said layer. While the process results in a usable component, it possesses several drawbacks. One of these is that the airfoil requires extensive and difficult machining to its final shape and dimensions. Another disadvantage is that welding of cladding pieces to each other, while in place over the heat conducting layer, can lead to poor quality welds at the joints.

SUMMARY OF THE INVENTION

In accordance with the present invention, we have discovered an improved method of making water cooled turbine nozzles which includes the following steps:

forming a wrought or cast copper or copper alloy airfoil core having longitudinal holes extending through the core at predetermined locations, and placing a first plurality of cooling tubes in the holes;

forming a top endwall having a composite structure comprising a first upper layer of stainless steel and a first lower layer of high thermal conductivity copper consolidated from metal powder, the top endwall having a second plurality of cooling tubes embedded in the first lower layer and extending through the first upper layer;

forming a bottom endwall having a composite structure comprising a second lower layer of stainless steel and a second upper layer of high thermal conductivity copper consolidated from metal powder, the bottom endwall having a third plurality of cooling tubes embedded in the second upper layer and extending through the second lower layer;

preforming a corrosion resistant outer cladding in the shape of a hollow body and having substantially the external dimensions of the nozzle and open at both ends;

placing the lower endwall, the airfoil and the upper endwall in the hollow cladding body and joining both endwalls and the airfoil together with a plurality of spar rods;

welding the spar rods, the cooling tubes and the cladding body to the top and the bottom endwalls to form an assembly;

evacuating air from the assembly and sealing under vacuum;

diffusion bonding the assembly under hot isostatic pressure; and machining the bonded assembly to the finished product.

The primary significance of our process is that in order to obtain adequate cooling of the gas turbine nozzle at the operating conditions the cooling tubing must be embedded in a heat conducting metal, e.g. copper. However, shaping the copper element by a casting or forging technique results in a substantially stronger product than by using the prior art powder metallurgy techniques which generally result in copper alloys with lower strengths. This is particularly important for the airfoil section of the nozzle where high tensile strengths are required to withstand the high thermal strains during service.

BRIEF DESCRIPTION OF THE DRAWING

This invention is more clearly understood from the following description taken in conjunction with the accompanying drawing in which.

DESCRIPTION OF THE PREFERRED EMBODIMENT

Figure 1:
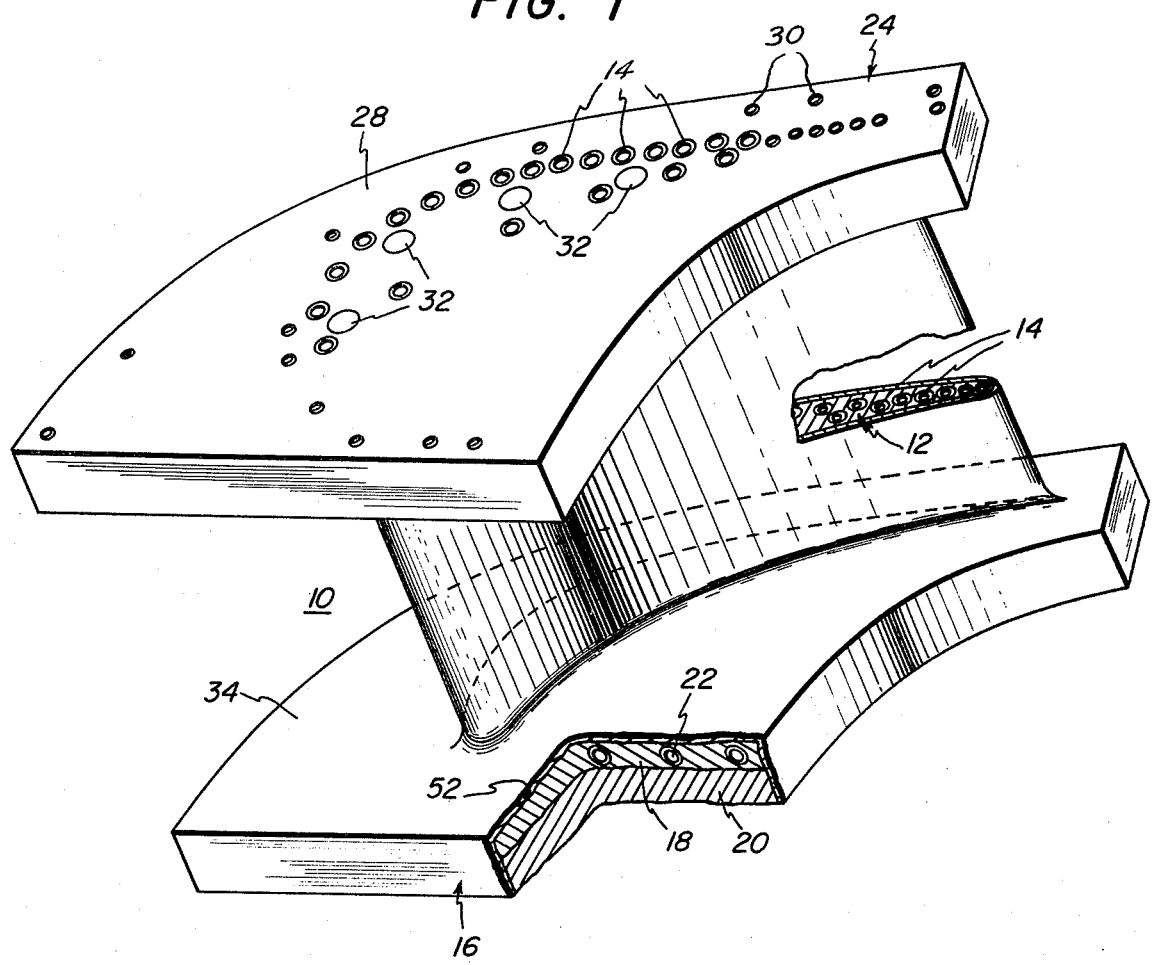
FIG. 1 is a perspective view, with portions broken away, of a composite nozzle for water cooled gas turbines which has been subjected to diffusion bonding according to the process of the present invention.
Figure 5:
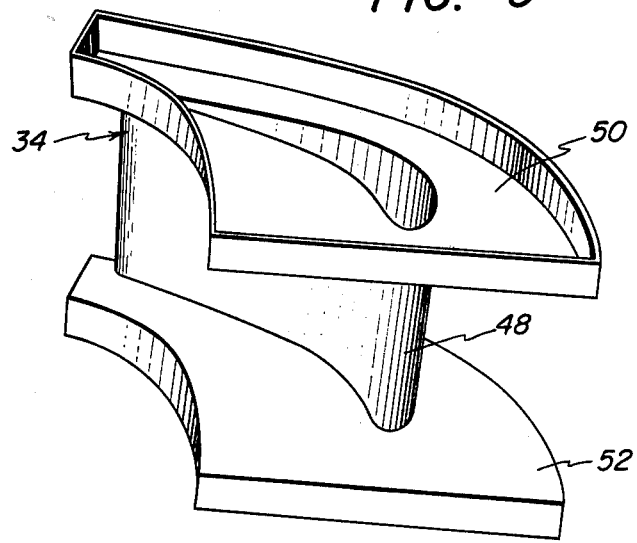
FIG. 5 is a three dimensional view of the preformed cladding for the nozzle of FIG. 1.
Figure 4:
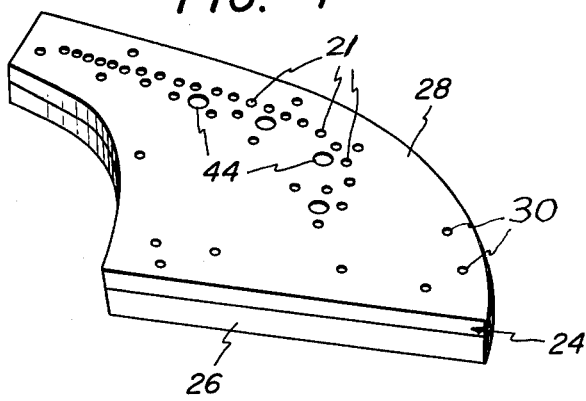
FIG. 4 is a three dimensional view of the top composite endwall for the nozzle of FIG. 1.

Referring to FIG. 1, a composite nozzle 10 for water cooled, high temperature gas turbines is shown which has been fabricated by the process of our invention. The nozzle 10 consists of a wrought or cast copper airfoil core 12 having a first plurality of cooling tubes 14 embedded in longitudinal holes located therein. Above the core 12 is a top endwall 24 having a composite structure, which is similar to the bottom endwall 16, of a first layer of high heat conducting metal shown as 26 in FIG. 4 and a second supporting and corrosion resistant layer 28 of stainless steel. A second plurality of cooling tubes 30 are embedded in the heat conducting layer and extend to outlets in the second layer 28 of the top endwall 24. Below the core 12 is a bottom endwall 16 having a composite structure of a first layer 18 of high heat conducting metal, e.g. copper, and a second supporting and corrosion resistant layer 20 of stainless steel. A third plurality of cooling tubes 22 are embedded in the first layer 18 and extend to outlets in the second layer 20. Extending from the top endwall 24, through the airfoil 12 and through the bottom endwall 16 are a plurality of spar rods 32. The first plurality of cooling tubes 14 are welded at the top to layer 28 of the top endwall 24 and at the bottom layer 20 of the bottom endwall 16. Enclosing the airfoil 12, the top endwall 24 and the bottom endwall 16 is a corrosion resistant cladding 34, since each of the enclosed members include a copper containing member which is not resistant to the corrosive atmosphere of the hot gases present during operation of the gas turbine.

Figure 2:
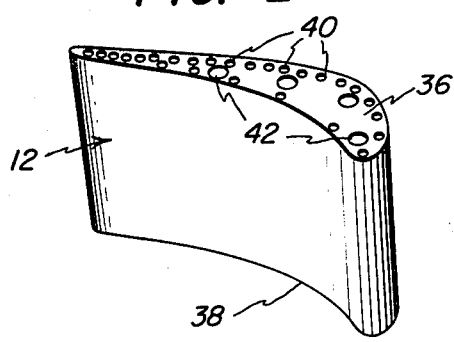
FIG. 2 is a three dimensional view of the cast copper airfoil core with predrilled holes for the nozzle of FIG. 1.

FIGS. 2 through 5 are representations of the separate components or members which after being subjected to diffusion bonding form the nozzle of FIG. 1. The airfoil core 12 is shown in FIG. 2 as having a top surface 36 and a bottom surface 38. There are small holes 40 for the first cooling tubes and large holes 42 for the spar rods which extend longitudinally through the core at predetermined locations. It is an important feature of nozzle 10 made by the process of our invention that rapid heat transfer occur between the surface of the nozzle 10 and the cooling water, (not shown) and accordingly, the metal used near those portions of the nozzle 10 at which cooling occurs must have excellent heat conducting properties, such as provided by pure copper and copper alloys. The airfoil core as used herein is made by conventional casting or forging techniques. Subsequently, small holes 40 and the large holes 42 are drilled into the airfoil core 12.

Figure 3:
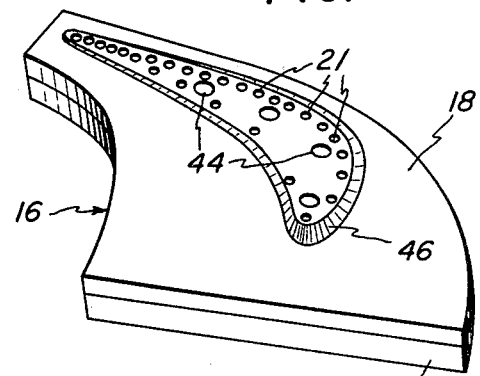
FIG. 3 is a three dimensional view of the bottom composite endwall for the nozzle of FIG. 1.

FIG. 3 illustrates the bottom endwall 16 as having a composite structure formed from first layer 18 of copper or copper alloy having a third plurality of cooling tubes embedded therein, generally in a serpentine shaped arrangement similar to those illustrated in FIG. 1. This first layer is formed by powder metallurgy techniques. The spar rods 32 in FIG. 1 subsequently pass through the larger holes 44. Similarly, the first plurality of cooling tubes 14 pass through the smaller endwall holes 21. There is also a first fillet 46 which is shaped to meet with and connect to the bottom surface 38 of the airfoil core 12. The other portion of the composite bottom endwall 16 is a corrosion resistant layer 20, typically formed from stainless steel and is illustrated in more detail in FIG. 4 which shows a top view of layer 28 of the top endwall 24. Bottom layer 26 is made from copper or copper alloy and has a configuration substantially similar to top layer 18 of endwall 16. The second plurality of cooling tubes 30 are embedded in the second layer 26 and pass through the corrosion resistant layer 28 also typically made of stainless steel. There are also a similar set of large holes 44 into which the spar rods 32 are mounted.

The airfoil core 12, the bottom endwall 16 and the top endwall 24 are aligned and assembled in a corrosion resistant, outer cladding 34 which is in the shape of a hollow body open at both ends and conforming substantially to the external dimensions of the nozzle 10 shown in FIG. 1. Forming of the cladding can be accomplished for example by the method outlined in Schilling, et al., U.S. Pat. No. 3,928,901. The cladding 34 is made by welding together an airfoil cladding section 48, a top endwall cladding section 50 and a bottom endwall cladding section 52.

The preferred cladding materials are nickel-chromium alloys, such as those commercially available from the International Nickel Company under the designation of IN-671 and IN-617. The simple nickel-chromium alloys consist essentially of 50-80% by weight of nickel and 20-50% by weight of chromium, with a preferred composition being Ni-50Cr. The more complex alloys contain a number of elements and are represented by IN-617 which has the following formulation:

| ELEMENTS | WEIGHT PERCENT |
| --- | --- |
| Chromium | 22% |
| Aluminum | 1% |
| Cobalt | 12.5% |
| Molybdenum | 9% |
| Boron | .003% |
| Carbon | .07% |
| Nickel | Balance |

At this point in the method of our invention the individual components are assembled by initially placing the bottom endwall 16 into the preformed cladding 34. Then the airfoil 12 containing cooling tubes 14 is placed in the cladding 34 and thereafter the top endwall 24 is placed over the airfoil 12. The spar rods 32 are passed through the rod openings 44 and 42 in the endwalls and the airfoil, respectively. The spar rods 32, cooling tubes 14, and cladding 34 are welded to the endwalls 16 and 24 to form an assembly. Air is evacuated from the assembly and the assembly is sealed under vacuum.

The assembly is then placed directly in a hot isostatic press and consolidated under appropriate parameters which involves critical conditions of temperature, pressure and time. The temperature should be between 1500° F. and 1900° F. When the temperature is below 1500° F. the time becomes excessively long and when the temperature goes above 1900° F. a risk of melting the copper occurs. The useful pressure is in the range of 1-25 ksi, subject to the general condition that the lower the temperature, the greater the pressure. The times are in the range of ½ to about 4 hours which should be sufficient to diffusion bond the assembly. The cooling tubes, as indicated are open internally to autoclave pressure and, as such, are prevented from collapsing.

In a preferred embodiment, the diffusion bonding occurs by placing the assembly directly in a hot isostatic press and subjecting the assembly to a temperature of 1800° F. (982° C.) at a pressure of 15 ksi and for a period of two hours. After removal from the autoclave the assembly is allowed to cool to room temperature in air. Subsequently, the bonded assembly is machined to the finished product by removing all excess weld materials and mating surfaces are shaped using conventional surface machining techniques.

It will be appreciated that the invention is not limited to the specific details shown in the examples and illustrations and that various modifications may be made within the ordinary skill in the art without departing from the spirit and scope of the invention.

We claim as our invention:

1. An improved method of making a water-cooled turbine nozzle comprising the steps of:
   (a) forming a copper or copper alloy airfoil core having longitudinal holes extending through said core at predetermined locations, and placing a first plurality of cooling tubes in said holes;

(b) forming a top endwall having a composite structure comprising a first upper layer of stainless steel and a first lower layer of high thermal conductivity copper consolidated from metal powder, said endwall having a second plurality of cooling tubes embedded in said first lower layer and extending through said first upper layer;

(c) forming a bottom endwall having a composite structure comprising a second lower layer of stainless steel and a second upper layer of high thermal conductivity copper consolidated from metal powder, said endwall having a third plurality of cooling tubes embedded in said second upper layer and extending through said second lower layer;

(d) preforming a corrosion resistant outer cladding in the shape of a hollow body open at both ends and having substantially the external dimensions of said nozzle;

(e) placing the bottom endwall, the airfoil and the top endwall in said hollow cladding body and joining both endwalls and the airfoil together with a plurality of spar rods;

(f) welding said spar rods, said cooling tubes and said cladding body to said endwalls to form an assembly;

(g) evacuating air from said assembly and sealing under vacuum;

(h) diffusion bonding said assembly under hot isostatic pressure; and (i) machining said bonded assembly to the finished product.

2. The method of claim 1, wherein diffusion bonding occurs at a temperature of about 1500°–1900° F., at a pressure of 1–25 ksi and for a time of 0.5–4 hours.

3. The method of claim 2, wherein said corrosion resistant cladding is an alloy consisting essentially in weight percent of 50–80% of nickel and 20–50% of chromium.

4. The method of claim 3, wherein said cladding is an alloy consisting essentially in weight percent of about 50% of nickel and 50% chromium.

5. The method of claim 2, wherein said diffusion bonding occurs at a temperature of 1800° F., at a pressure of 10 ksi and for a time of 2 hours.

* * * * *